(12) United States Patent
Sako et al.

(10) Patent No.: US 6,657,938 B1
(45) Date of Patent: Dec. 2, 2003

(54) DISK HAVING EXPANDED ELAPSED TIME INFORMATION

(75) Inventors: Yoichiro Sako, Tokyo (JP); Tetsuji Kawahima, Kanagawa (JP); Yukio Shishido, Kanagawa (JP); Shigeki Tsukatani, Kanagawa (JP); Katsumi Toyama, Kanagawa (JP); Tatsuya Inokuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/675,961

(22) Filed: Sep. 29, 2000

(30) Foreign Application Priority Data

Sep. 29, 1999 (JP) .......................................... P11-277426

(51) Int. Cl.[7] ................................................. G11B 5/76
(52) U.S. Cl. ............................. 369/59.25; 369/124.08; 369/275.3
(58) Field of Search .......................... 369/47.15, 47.19, 369/47.2, 47.21, 47.22, 59.25, 124.07, 53.2, 275.3

(56) References Cited

U.S. PATENT DOCUMENTS 6,075,920 A * 6/2000 Kawamura et al. ........... 386/95

FOREIGN PATENT DOCUMENTS

| EP | 0600224 | 6/1994 |
|----|---------|--------|
| EP | 0939398 | 9/1999 |
| EP | 1089281 | 4/2001 |
| EP | 1089282 | 4/2001 |
| JP | 7262754 | 10/1995 |
| JP | 11096689 | 4/1999 |
| JP | 11120707 | 4/1999 |

* cited by examiner

Primary Examiner—Paul W. Huber
(74) Attorney, Agent, or Firm—Jay H. Maioli

(57) ABSTRACT

A data record medium on which a digital signal has been recorded in which the digital signal is composed of main data and a sub code, the sub code having time information representing reproduction elapsed time, and the sub code being recorded in association with the main data, wherein information that represents the reproduction elapsed time of the sub code is represented with a binary coded decimal number and address information in synchronization with the time information of the main data is represented with a binary number, the address information being contained in the main data.

27 Claims, 12 Drawing Sheets

FORMAT OF SUB CODE FRAME OF CD

FORMAT OF SUB CODE PORTION OF CD

FORMAT OF Q CHANNEL

FORMAT OF DATA BIT BLOCK

Fig. 8

| MIN | | | | | | | | | SEC | | | | | | | | FRAME | | | | | | | |
|---|---|---|---|---|---|---|---|---|---|---|---|---|---|---|---|---|---|---|---|---|---|---|---|---|
| M1 | M2 | M3 | M4 | M5 | M6 | M7 | M8 | | S1 | S2 | S3 | S4 | S5 | S6 | S7 | S8 | | F1 | F2 | F3 | F4 | F5 | F6 | F7 | F8 |

FORMAT OF TIME INFORMATION

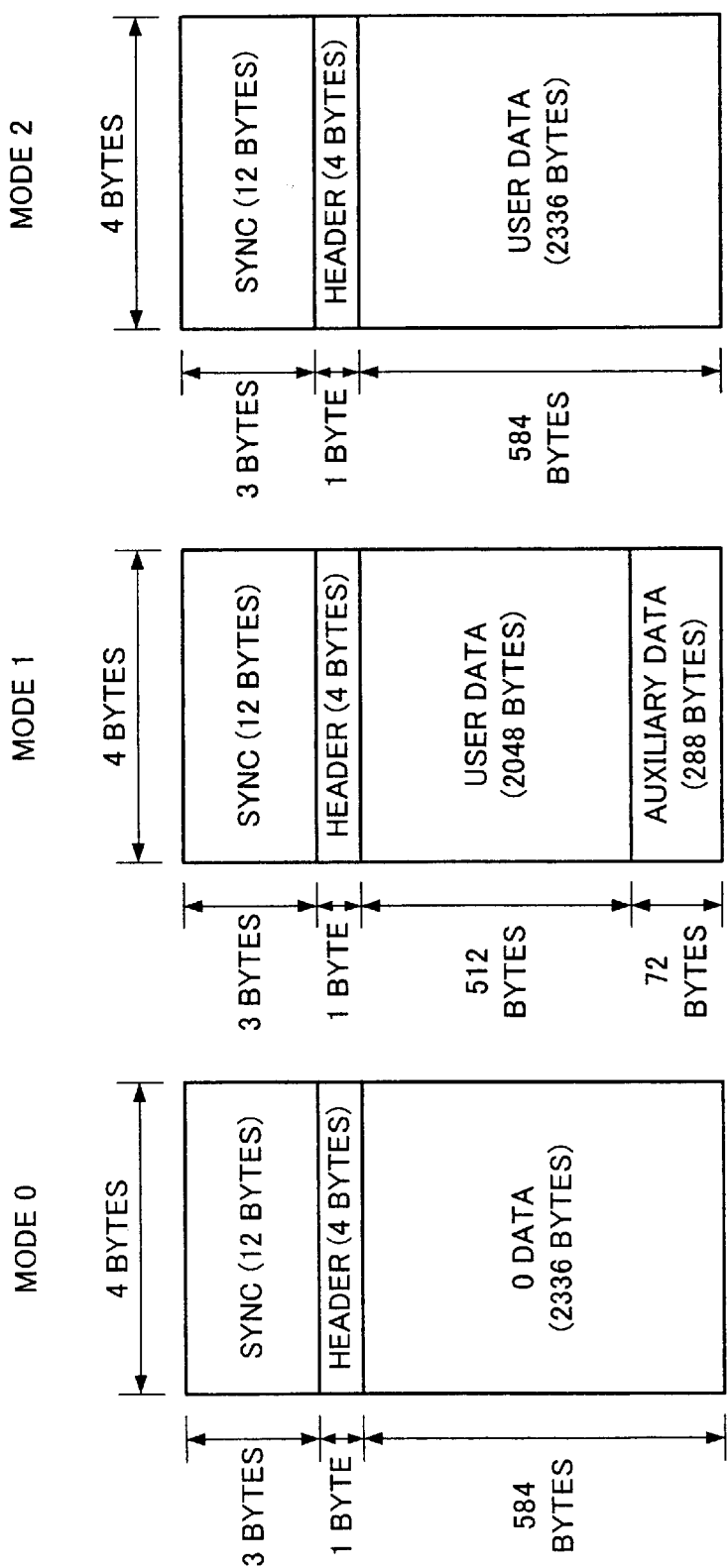

FORMAT OF HEADER PORTION
OF CONVERTIONAL CD-ROM

FORMAT OF HEADER PORTION
OF HIGH DENSITY CD-ROM

FORMAT OF SUB CODE OF HIGH DENSITY CD-ROM

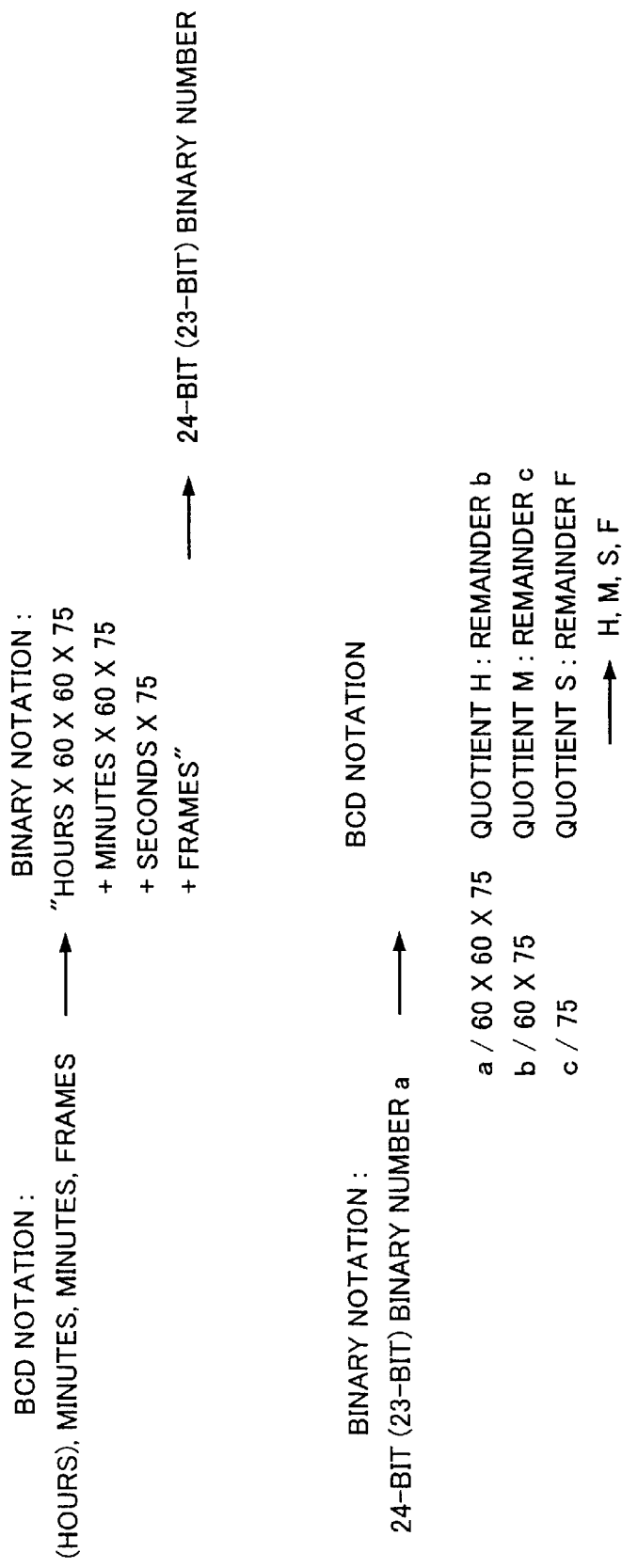

ENLARGED PERSPECTIVE VIEW SHOWING
PRINCIPAL PORTION OF PRE-GROOVE

VIEW FOR EXPLAINING PRE-GROOVE

ATIP FORMAT OF CONVENTIONAL DISC

ATIP FORMAT OF HIGH DENSITY DISC

DISK HAVING EXPANDED ELAPSED TIME INFORMATION

BACKGROUND OF THE INVENTION

1. Field of the Invention

The present invention relates to a data record medium, a recording apparatus, a reproducing apparatus, and a reproducing method that allow addresses corresponding to a high density structure to be displayed.

2. Description of the Related Art

As a record medium on which audio data is digitized and optically recorded, a compact disc (CD) is well known. A CD has a diameter of 12 cm, a track as pitch of 1.6 µm, and a line velocity of 1.2 m/s. On a CD, digital audio data of up to 74.7 minutes can be recorded. When the track pitch of a CD is as narrow as 1.5 µm as the narrowest pitch defined in its standard, digital audio data of around 80 minutes can be recorded.

In addition, as a read-only record medium, a CD-ROM of which a CD is applied to a ROM (Read Only Memory) in such a manner that digital data other than digital audio data is pre-recorded to an audio record area of the CD has become common. In the same standard as a CD, digital data of 650 Mbytes or more equivalent to digital audio data of 74.7 minutes can be recorded to a CD-ROM.

Each of a CD and a CD-ROM has a sub code composed of eight channels (P, Q, R, S, T, U, V, and W channels). Time information of digital data that is recorded is placed in 72 bits of the Q channel. The time information is categorized as two types of reproduction elapsed time referred to as absolute time and relative time. The absolute time represents a time period from the beginning of the record area. The relative time represents a time period from the beginning of each music program or each index. Each of the two types of elapsed time is represented as minutes (MIN), seconds (SEC), and frames (FRAME) as time units. In a CD, the time information represents address information of digital data.

Each of the time units "MIN", "SEC", and "FRAME" is assigned data of eight bits and represented with a two-digit BCD (Binary Coded Decimal) number. Thus, in a CD and a CD-ROM, "SEC" is represented from "00" to "59" in the BCD notation; "FRAME" is represented from "00" to "74" since one second is equivalent to 75 frames; and "MIN" is represented from "00" to "79" because the recordable time period of digital data corresponding to the CD standard is less than 80 minutes (in other words, in the non-CD standard, "MIN" is represented from "00" to "99" in the BCD notation).

On a CD-ROM, time information (address information) has been recorded to a header portion of main data as well as the Q channel. As with the Q channel, each of "MIN", "SEC", and "FRAME" is assigned data of eight bits and represented with a two-digit BCD number.

On a blank write-once-read-many type CD-R (CD-Recordable) disc and a rewritable type CD-RW (CD-Rewritable) disc, record address information referred to as ATIP (Absolute Time In Pre-grooves) is FM-modulated and recorded to guide grooves (pre-grooves) that are wobbled in the radius direction with a sine wave of 22.05 kHz in the format of "MIN", "SEC", and "FRAME" in the BCD notation.

As advancement of the pit forming technology and recording and/or reproducing technologies and achievement of short wavelengths of laser light, as with a DVD (Digital Versatile Disc or Digital Video Disc), the storage capacity of record mediums tends to increase. Thus, requirements of high density structures of conventional CD and CD-ROM are becoming strong.

When the record densities of the conventional CD and CD-ROM are doubled, digital data of around 150 minutes can be recorded. When their record densities are quadrupled, digital data of around 300 minutes can be recorded.

However, in the conventional CD and CD-ROM, as was described above, each of "MIN", "SEC", and "FRAME" that are time information is represented with a two-digit BCD number. Thus, the time information of the conventional CD-and-CD-POM cannot represent a time exceeding 100 minutes. As a result, the system does not work.

OBJECTS AND SUMMARY OF THE INVENTION

The present invention is made from the above-described point of view. An object of the present invention is to solve a problem of conventional CD and CD-ROM and provide a record medium that allows time information corresponding to a high density structure to be displayed with maintaining the compatibility thereof. In addition, to allow the present invention to be properly applied to a computer, address information of a CD-ROM and ATIP of a CD-R and a CD-RW are represented in the binary notation. Another object of the present invention is to provide a recording apparatus that records such time information to a record medium. A further object of the present invention is to provide a reproducing apparatus that reproduces such time information from a record medium.

To solve the above-described problem, a first aspect of the present invention is a data record medium for recording a digital signal composed of main data and a sub code, the sub code having time information representing reproduction elapsed time, the sub code being recorded in association with the main data, wherein the time information representing the reproduction elapsed time contained in the sub code has a sub code area represented with a binary coded decimal number, a header area for address information that is a part of the main data and that is in synchronization with the time information, and a data area for user data that is received from the outside as a part of the main data, the address information being represented with a binary number.

A second aspect of the present invention is a data record medium on which record address information as a guide for data has been recorded with a binary number, wherein the data record medium has a record area for main data and a sub code corresponding to the record address information, the sub code having time information representing reproduction elapsed time in a binary coded decimal notation in association with the main data.

A third aspect of the present invention is a recording apparatus for recording main data and a sub code to a data record medium, the sub code having time information representing reproduction elapsed time, the sub code being recorded in association with the main data, comprising: means for generating the time information with a binary coded decimal number;

converting means for converting the binary coded decimal number into a decimal number; and recording means for causing said converting means to convert address information contained in the main data and is in synchronization with the time information into a binary number and recording the resultant data along with the time information to the data record medium.

A fourth aspect of the present invention is a data recording apparatus for recording main data and a sub code to a data record medium, the sub code having time information representing reproduction elapsed time, the sub code being recorded in association with the main data, comprising: means for generating address information that is contained in the main data, is in synchronization with the time information, and is represented with a binary number; converting means for converting the binary number into a binary coded decimal number; and recording means for forming a sub code with the time information converted into the binary coded decimal number by said converting means and recording the sub code along with the main data to the data record medium.

A fifth aspect of the present invention is a data recording apparatus for recording data to a data record medium on which record address information for recording data have been formed with a binary number and the record address information has been assigned with guide grooves wobbled at predetermined intervals, comprising: reproducing means for reproducing the record address information from the data record medium; first recoding means for recording time information representing reproduction elapsed time of main data in synchronization with record address information reproduced by said reproducing means with a binary coded decimal number, the time information being in association with the main data; and second recording means for recording the main data.

A sixth aspect of the present invention is a reproducing apparatus for reproducing main data and a sub code from a data record medium, the sub code having time information representing reproduction elapsed time represented with a binary coded decimal number, the sub code being recorded in association with the main data, comprising: reproducing means for reproducing the main data and the sub code from the data record medium; first extracting means for extracting the time information from the sub code reproduced by said reproducing means; and second extracting means for extracting address information represented with a binary number from the main data reproduced from said reproducing means.

A seventh aspect of the present invention is a reproducing method for reproducing main data and a sub code from a data record medium, the sub code having time information representing reproduction elapsed time represented with a binary coded decimal number, the sub code being recorded in association with the main data, comprising the steps of: reproducing the main data and the sub code from the data record medium; extracting the time information from the sub code reproduced at the reproducing step; and extracting address information represented with a binary number from the main data reproduced at the reproducing step.

According to the present invention, for a data record medium such as a high density CD, in consideration of the compatibility with a conventional medium, when necessary, time information including hour information (HOUR) is represented in the BCD notation. For a data record medium such as a CD-ROM, in consideration with the harmonization with a personal computer, the notation of "minutes, seconds, and frames" is converted into the notation of "frames"represented with a 24-bit (or 23-bit) binary number. For mediums such as a CD-R and a CR-RW, in consideration with the harmonization with a personal computer, ATIP is represented with a 24-bit (or 23-bit) binary number.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 8 is a schematic diagram showing an example of the format of time information of the record medium according to the embodiment of the present invention;

FIGS. 9A, 9B, and 9C are schematic diagrams showing examples of the data format of a CD-ROM according to the present invention;

FIG. 11 is a schematic diagram for explaining a method for converting an address represented in the BCD notation into an address represented in the binary notation;

DETAILED DESCRIPTION OF THE PREFERRED EMBODIMENT

Next, with reference to the accompanying drawings, an embodiment of the present invention will be described.

An embodiment of the present invention is a mastering apparatus and a reproducing apparatus. The mastering apparatus is a recording apparatus that creates a maser of a compact disc (CD) as a record medium on which digital audio data as main data has been recorded. The reproducing apparatus reproduces digital audio data from an audio compact disc (Compact Disc-Digital Audio: CD-DA) as a record medium on which digital audio data has been recorded.

Figure 1:
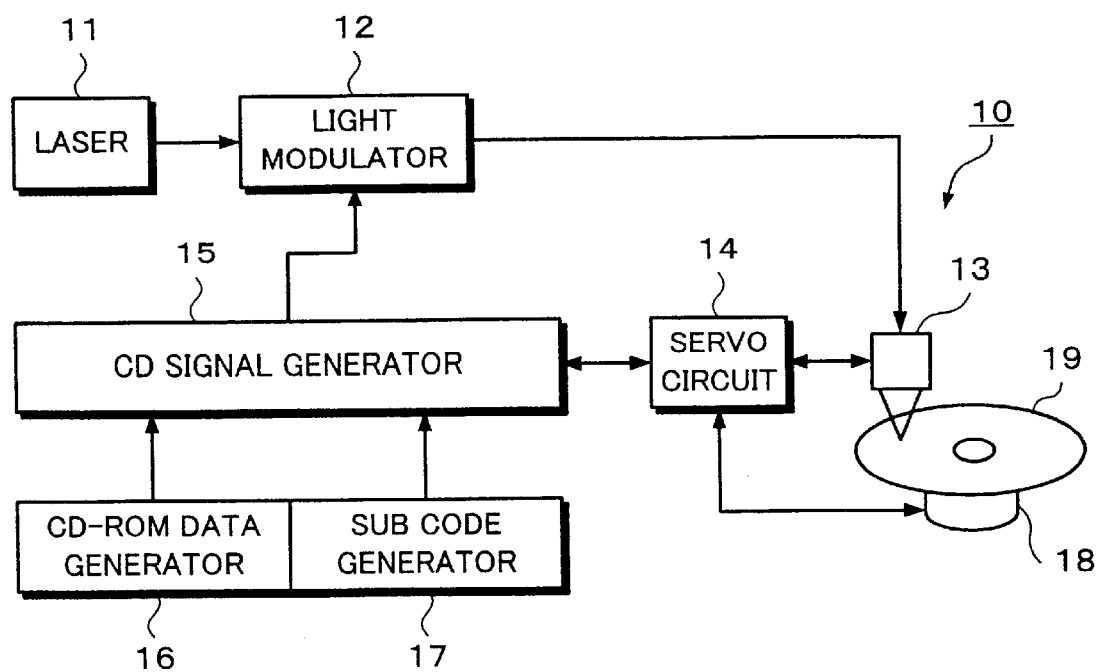
FIG. 1 is a block diagram showing the structure of a mastering apparatus according to an embodiment of the present invention.

In FIG. 1, reference numeral 10 represents the overall structure of the mastering apparatus. As shown in FIG. 1, the mastering apparatus 10 comprises a laser 11, a light modulator 12, and an optical pickup 13. The laser 11 is for example a gas laser (such as an Ar ion laser, a He—Cd laser, or a Kr ion laser) or a semiconductor laser. The light modulator 12 is of an acoustooptic effect type. The light modulator 12 modulates (turns on and off) laser light emitted from the laser 11 corresponding to a signal that is output from a CD signal generator 15 (that will be descried later). The optical pickup 13 is a recording means that has an objective lens and so forth. The optical pickup 13 collects laser light that passes through the light modulator 12 and radiates the collected laser light to a photoresist (photosensitive substance) surface of a disc-shaped glass maser disc 19.

The mastering apparatus 10 further comprises a servo circuit 14, a CD signal generator 15, a CD-ROM data generator 16, a sub code generator 17, and a spindle motor 18. The servo circuit 14 performs a tracking operation for keeping the distance between the optical pickup 13 and the glass maser disc 19 constant and controls the rotating and driving operation of a spindle motor 18 (that will be described later). The CD signal generator 15 generates a CD signal recorded on the glass maser disc 19 and turns on and off the light modulator 12 corresponding to CD-ROM data (main data) received from a CD-ROM data generator 16 (that will be described later) and a sub code that is received from a sub code generator 17 (that will be described later). The CD-ROM data generator 16 generates the CD-ROM data. The sub code generator 17 generates a sub code (that will be described later). The spindle motor 18 rotates and drives the glass maser disc 19.

The mastering apparatus 10 modulates the laser light emitted from the laser 11 corresponding to a signal generated by the CD signal generator 15. The mastering apparatus 10 radiates the modulated laser light to the glass maser disc 19 and thereby creates a maser on which the CD-ROM data has been recorded.

A signal recorded on the glass maser disc 19 by the mastering apparatus 10 is generated by the CD signal generator 15. The CD signal generator 15 converts the CD-ROM data generated by the CD-ROM data generator 16 and the sub code generated by the sub code generator 17 into data corresponding to the CD format. The CD signal generator 15 divides 16 bits of one sample or one word into high order eight bits and low order eight bits. Each of the high order eight bits and the low order eight bits is treated as a symbol. An error correction code encoding process for adding error correction parity data or the like with for example CIRC (Cross Interleave Reed-Solomon Code) and a scrambling process are performed for each symbol. The resultant data is modulated corresponding to EFM (Eight to Fourteen Modulation) method.

Figure 2:
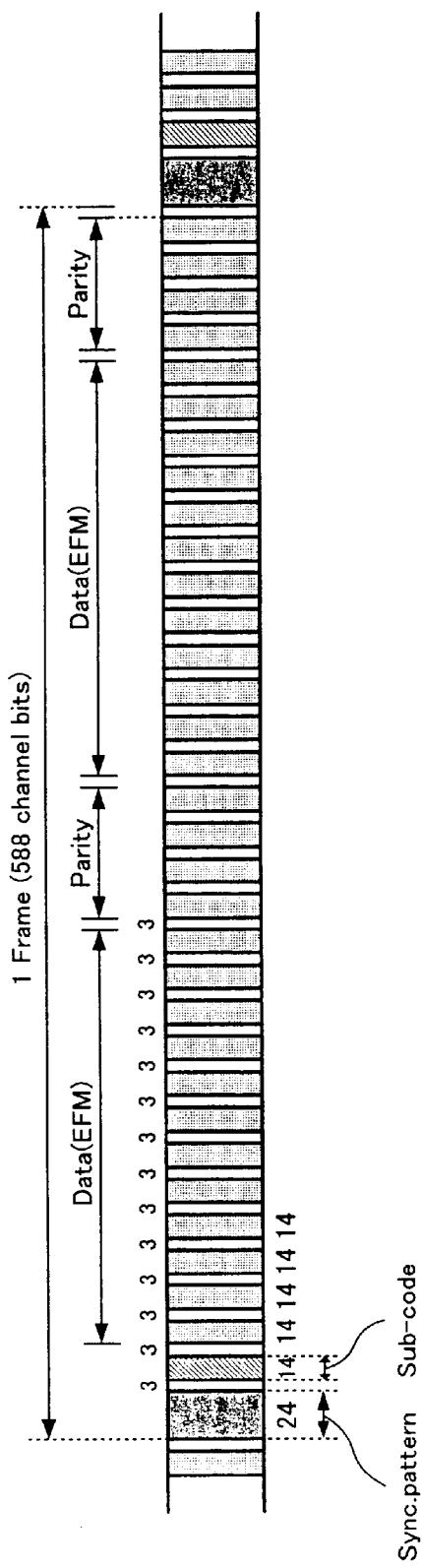
FIG. 2 is a schematic diagram showing an example of the format of a frame of a CD according to the embodiment of the present invention.

FIG. 2 shows the data structure of one frame that has been modulated. In a CD, with a total of 12 samples (24 symbols) of digital audio data of two channels, a parity Q of four symbols and a parity P of four symbols are formed. One symbol of a sub code is added to the 32 symbols. The resultant 33 symbols (264 data bits) are treated as one block. In other words, one frame that has been EFM modulated contains 32 symbols composed of a sub code, data of 24 symbols, a Q parity of four symbols, and a P party of four symbols.

In the EFM method, each symbol (eight data bits) is converted into 14 channel bits. Three connection bits are placed between two 14-channel-bit blocks. In addition, a frame sync pattern is placed at the beginning of the frame. The frame sync pattern is a pattern of 11T, 11T, and 2T (where T is the period of one channel bit). Such a pattern is a unique pattern that does not take place in the EFM rule. In other words, with such an unique pattern, a frame sync is detected. One frame is composed of a total of 588 channel bits.

Figures 3, 4:
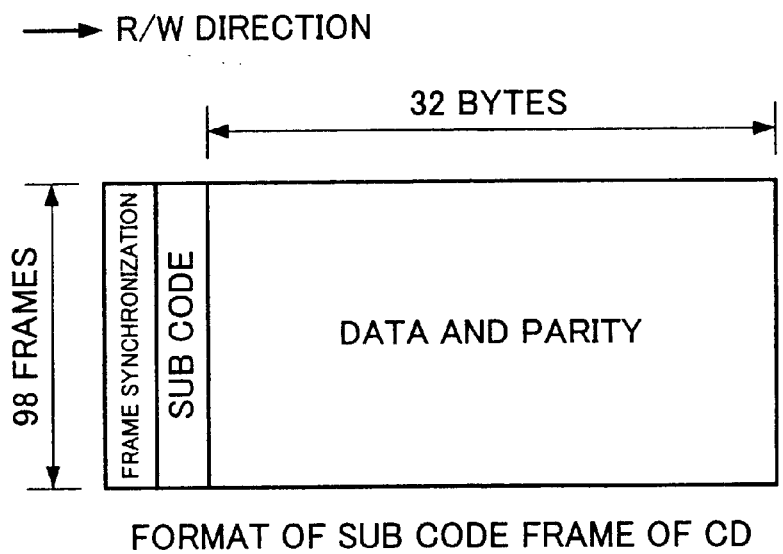
FIG. 3 is a schematic diagram showing an example of the format of sub code frames of the CD according to the embodiment of the present invention.
FIG. 4 is a schematic diagram showing an example of the format of a sub code portion of the CD according to the embodiment of the present invention.

A block of 98 frames is referred to as sub code frame. As shown in FIG. 3, a sub code frame of which 98 frames are successively arranged in the vertical direction is composed of a frame synchronization portion, a sub code portion, and a data and parity portion. One sub code frame is equivalent to 1/75 seconds of the reproduction time of a conventional CD.

A sub code generated by the sub code generator 17 is placed in a sub code portion. As shown in FIG. 4, the sub code portion is composed of 98 frames F01 to F98. The frames F01 and F02 of the sub code portion serve as synchronous patterns of the sub code frames. In addition, the frames F01 and F02 serve as patterns S0 and S1 of an out-of-rule of EFM, respectively. Each bit of the frames F01 to F98 of the sub code portion composes the P, Q, R, S, T, U, V, and W channels. For example, the P channel is composed of parts of S0 and S1 and P01 to P98.

The R channel to W channel are used for a special purpose such as a still picture and a sub title of so-called Karaoke. The P channel and the Q channel are used to control the track position of the pickup when digital data recorded on the CD-ROM is reproduced.

The P channel is used to record a signal "0" in a so-called lead in area at the inner peripheral portion of the disc and to record a signal that repeats "0" and "1" at predetermined intervals in a so-called lead out area at the outer peripheral portion of the disc. In addition, the P channel is used to record a signal "1" between music programs in a program area formed between the lead in area and the lead out area of the disc and to record a signal "0" in the other area. The P channel is also used to detect the beginning portion of each music program when digital audio data recorded on the CD is reproduced.

Figure 5:
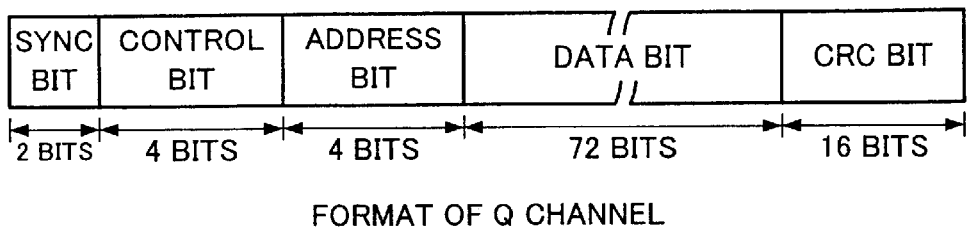
FIG. 5 is a schematic diagram showing an example of the format of a Q channel of the CD according to the embodiment of the present invention.

The Q channel is used to accurately control the pickup when digital audio data is reproduced from the CD. As shown in FIG. 5, one sub code frame of the Q channel is composed of a synchronous bit portion 21, a control bit portion 22, an address bit portion 23, a data bit portion 24, and a CRC bit portion 25.

The synchronous bit portion 21 is composed of data of two bits. The synchronous bit portion 21 contains a part of the above-descried synchronous pattern.

The control bit portion 22 is composed-of data of four bits that represent the number of audio channels and identify emphasis, digital data, and so forth. When the four-bit data of the control bit portion 22 is "0000", it represents two-channel audio without pre-emphasis. When the four-bit data of the control bit portion 22 is "1000", it represents four-channel audio without pre-emphasis. When the four-bit data of the control bit portion 22 is "0001", it represents two-channel audio with pre-emphasis. When the four-bit data of the control bit portion 22 is "1001", it represents four-channel audio with pre-emphasis. When the four-bit data of the control bit portion 22 is "0100", it represents a data track of a so-called CD-ROM (CD-Read Only Memory) or the like rather than audio data.

The address bit portion 23 is composed of data of four bits that represent the format and type of data contained in the data bit portion 24 (that will be described later).

The CRC bit portion 25 is composed of data of 16 bits that contain data for detecting an error of CRC (Cyclic Redundancy Check code).

Figure 6:
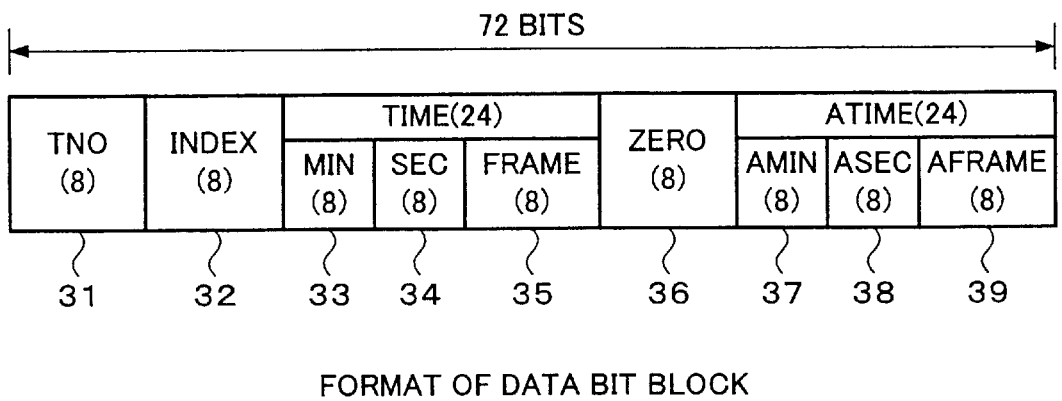
FIG. 6 is a schematic diagram showing an example of the format of a data bit block of the CD according to the embodiment of the present invention.

The data bit portion 24 is composed of data of 72 bits. When the four-bit data of the address bit portion 23 is "0001", as shown in FIG. 6, the data bit portion 24 is composed of a track number portion (TNO) 31, an index portion (INDEX) 32, an elapsed time minute component portion (MIN) 33, an elapsed time second component portion (SEC) 34, an elapsed time frame portion (FRAME) 35, a zero portion (ZERO) 36, an absolute time minute component portion (AMIN) 37, an absolute time second component portion (ASEC) 38, and an absolute time frame portion (AFRAME) 39. Each of these portions is composed of data of eight bits.

The track number portion (TNO) 31 is represented with a two-digit binary coded decimal (BCD) number. When the track number portion (TNO) 31 is "00", it represents a lead in track number of a track from which data is read. When the track number portion (TNO) 31 is one of "01" to "99", it represents a track number of a music program, a movement, or the like. When the track number portion (TNO) 31 is "AA" in the hexadecimal notation, it represents a lead-out track number of a track with which data that is read is completed.

When the index portion (INDEX) 32 is "00" represented with a two-digit BCD number, it represents a pause. When the index portion (INDEX) 32 is one of "01" to "99", it represents a sub track of a music program, a movement, or the like.

Each of the elapsed time minute component portion (MIN) 33, the elapsed time second component portion (SEC) 34, and the elapsed time frame portion (FRAME) 35 is represented with a two-digit BCD number. Thus, the elapsed time (TIME) of each music or each movement is represented with a total of six digits.

The eight bits of the zero portion (ZERO) 36 are all "0s".

Each of the absolute time minute component portion (AMIN) 37, the absolute time second component portion (ASEC) 38, and the absolute time frame portion (AFPAME) 39 is represented with a two-digit BCD number. These portions represent an elapsed time (ATIME) from the first music program with a total of six digits.

Figure 7:
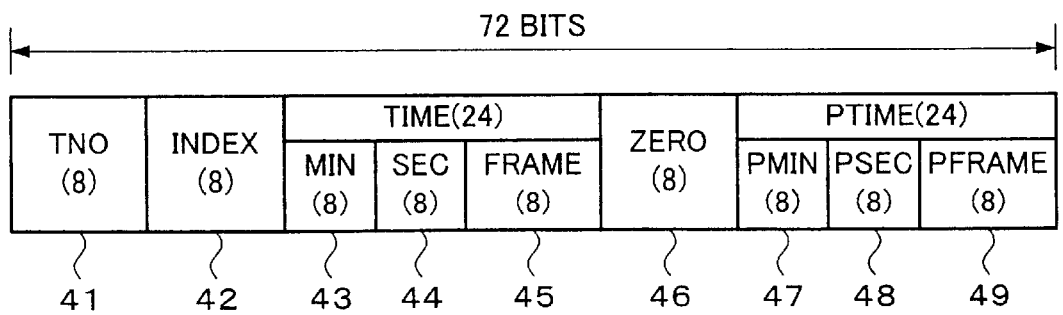
FIG. 7 is a schematic diagram showing an example of the format of a data bit block of TOC of a record medium according to the embodiment of the present invention.

As shown in FIG. 7, the data bit portion 24 of TOC (Table Of Contents) in the lead in area of the disc is composed of a track number portion (TNO) 41, a point portion (POINT) 42, an elapsed time minute component portion (MIN) 43, an elapsed time second component portion (SEC) 44, an elapsed time frame portion (FRAME) 45, a zero portion (ZERO) 46, an absolute time minute component portion (PMIN) 47, an absolute time second component portion (PSEC) 48, and an absolute time frame portion (PFRAME) 49. Each of these portions is composed of data of eight bits.

Each of the track number portion (TNO) 41, the elapsed time minute component portion (MIN) 43, the elapsed time second component portion (SEC) 44, and the elapsed time frame portion (FRAME) 45 is fixed to "00" in the hexadecimal notation. As with the zero portion (ZERO) 36, the eight bits of the zero portion (ZERO) 46 are all "0s".

When the point portion (POINT) 42 is "A0" in the hexadecimal notation, the absolute time minute component portion (PMIN) 47 represents the first music program number or the first movement number. When the point portion (POINT) 42 is "A1" in the hexadecimal notation, the absolute time minute component portion (PMIN) 47 represents the last music program number or the first movement number. When the point portion (POINT) 42 is "A2" in the hexadecimal notation, the absolute time minute component portion (PMIN) 47, the absolute time second component portion (PSEC) 48, and the absolute time frame portion (PFRAME) 49 represent the absolute time (PTIME) at which the lead-out area starts. When the point portion (POINT) 42 is represented with a two-digit BCD number, the absolute time minute component portion (PMIN) 47, the absolute time second component portion (PSEC) 48, and the absolute time frame portion (PFRAME) 49 represent an address at which a music program or a movement starts in an absolute time (PTIME).

Thus, the Q channel contains time information represented with 24 bits although the format of the program area of the disc is slightly different from the format of the lead in area.

Next, the representing format of the time information will be described in reality. In the following description, all the elapsed time minute component portion (MIN) 33, the absolute time minute component portion (AMIN) 37, the elapsed time minute component portion (MIN) 43, and the absolute time minute component portion (PMIN) 47 are referred to as "MIN". Likewise, all the elapsed time second component portion (SEC) 34, the absolute time second component portion (ASEC) 38, the elapsed time second component portion (SEC) 44, and the absolute time second component portion (PSEC) 48 are referred to as "SEC". In addition, all the elapsed time frame portion (FRAME) 35, the absolute time frame portion (AFRAME) 39, the elapsed time frame portion (FRAME) 45, and the absolute time frame portion (PFRAME) 49 are referred to as "FRAME".

In other words, in the following description, "MIN" represents at least one of the elapsed time minute component portion (MIN) 33, the absolute time minute component portion (AMIN) 37, the elapsed time minute component portion (MIN) 43, and the absolute time minute component portion (PMIN) 47. Likewise, "SEC" represents at least one of the elapsed time second component portion (SEC) 34, the absolute time second component portion (ASEC) 38, the elapsed time second component portion (SEC) 44, and the absolute time second component portion (PSEC) 48. In addition, "FRAME" represents at least one of the elapsed time frame portion (FRAME) 35, the absolute time frame portion (AFRAME) 39, the elapsed time frame portion (FRAME) 45, and the absolute time frame portion (PFRAME) 49. In the following description, information represented in a combination of "MIN", "SEC", and "FRAME" is referred to as time information.

As shown in FIG. 8, in the time information, eight bits assigned to each of "MIN", "SEC", and "FRAME" is divided into high order four bits and low order four bits so as to represent a two-digit decimal number. Now, the case that "10 minutes, 10 seconds, 10 frames" is represented will be considered as a real example. In this case, in "MIN", the high order four bits denoted by M1 to M4 represent "1" in the decimal notation, whereas the low order four bits denoted by M5 to M8 represent "0" in the decimal notation. Thus, M1 to M8 represent "00010000". Likewise, in "SEC" and "FRAME", S1 to S8 and F1 to F8 represent "00010000" and "00010000", respectively.

The above description was focused on a CD-DA. However, it should be noted that the present invention can be basically applied to the representation of absolute addresses of digital data recorded on a CD-ROM and absolute addresses assigned to pre-grooves of a CD-R (CD-Recordable) and a CD-RW (CD-Rewritable). In other words,- the present invention can be applied to various types of CDs. In addition, the present invention can be applied to a phase change type disc, a magneto-optically recordable disc, and so forth as recordable discs.

Next, the case that the present invention is applied to for example a CD-ROM will be described. In a CD-ROM, the access unit is 2,352 bytes contained in 98 frames of one period of a sub code. This access unit is also referred to as block or sector. The length of one frame is the same as the length of the sub code frame of the above-described CD. Thus, the length of one frame is 1/75 seconds. A CD-ROM has three modes that are mode 0, mode 1, and mode 2. As shown in FIGS. 9A, 9B, and 9C, the data format of the CD-ROM slightly varies corresponding to each mode.

In other words, as shown in FIG. 9A, in the data format of the mode 0, there are a sync portion of 12 bytes, a header portion of four bytes, and a data portion of 2336 bytes. The sync portion contains a signal for delimiting a frame. The header portion will be described later. The data portion is all "0". The mode 0 is used for a dummy block in the case that the lead in area and the lead out area are the same as those of the CD-ROM structure.

As shown in FIG. 9B, in the data format of the mode 1, there are a sync portion of 12 bytes, a header portion of four bytes, a user data portion of 2048 bytes, and an auxiliary data portion of 288 bytes. The sync portion contains a signal for delimiting a frame. The header portion will be described later. The user data portion is target information. The auxiliary data portion contains an error detection/correction code. In the mode 1, with the auxiliary data portion, the error correction capability is improved. The mode 1 is suitable for recording data with high reliability such as character code and computer data.

As shown in FIG. 9C, in the data format of the mode 2, there are a sync portion of 12 bytes, a header portion of four bytes, and a user data portion of 2336 bytes. The sync portion contains a signal for delimiting a frame. The header portion will be described later. The user data portion is target information. In the mode 2, all areas preceded by the header portion are used as the user data portion rather than the additional error correction code. The mode 2 is suitable for recording data that can be error corrected by an interpolating process as with audio data and video data.

Figure 10A:
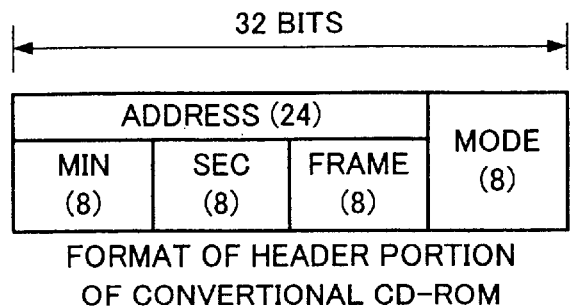
FIGS. 10A and 10B are schematic diagrams showing examples of the formats of header portions of a conventional CD-ROM and a high density CD-ROM and FIG. 10C shows a format of a subcode of a high density CD-ROM.

The header portion of a conventional CD-ROM has a structure as shown in FIG. 10A regardless of the mode 0, 1, or 2. In other words, the header portion is composed of an absolute address portion (ADDRESS) of 24 bits and a mode portion (MODE) of eight bits. The absolute address portion represents the absolute address of a frame with time information of minutes (MIN), seconds (SEC), and frames (FRAME). The mode portion (MODE) represents one of the above-descried modes.

The absolute address portion (ADDRESS) is composed of an absolute address minute component portion (MIN), an absolute address second component portion (SEC), and an absolute address frame portion (FRAME). Each of these portions is composed of eight bits. The absolute address portion (ADDRESS) is equivalent to the time information of the Q channel of the sub code of the above-described CD-DA (namely, they are correlated in the relation of one to one). Each of the absolute address minute component portion (MIN), the absolute address second component portion (SEC), and the absolute address frame component portion (FRAME) is represented with a two-digit BCD number.

A CD-ROM has the above-described sub code portion (not shown). The Q channel contains an absolute address represented with the above-descried "MIN", "SEC", and "FRAME".

Figure 10B:
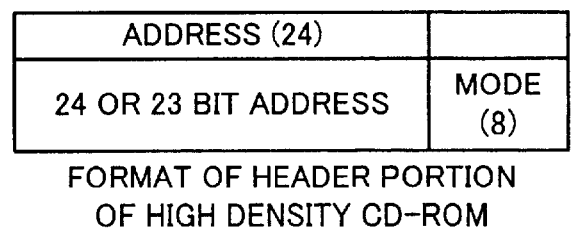

In a modified CD-ROM according to the present invention (hereinafter this CD-ROM is referred to as high density CD-ROM), to allow time information of digital data that exceeds 80 minutes or 100 minutes to be represented, as shown in FIG. 10B, all the areas of "MIN", "SEC", and "FRAME" of the header portion are represented with a 24-bit binary number. When addresses are represented with a 24-bit binary number, there are combinations of $2^{24}=16777216$. Thus, assuming that the data amount of one frame is 2 kbytes, data of up to around 33 Gbytes can be represented. Thus, the time information of digital data corresponding to a high density CD-ROM can be represented.

In addition, with one predetermined bit or a plurality of predetermined bits of 24 bits, address information represented in the BCD notation can be distinguished from address information represented in the binary notation. For example, the most significant bit of 24 bits can be used so that they can be distinguished. In the case of an address represented in the binary notation, "1" is assigned to the most significant bit. When a conventional CD-ROM deals with digital data of 99 minutes, the most significant bit of the time information (minutes) may become "1". However, actually, there are no discs containing digital data exceeding 80 minutes. Thus, the most significant bit does not become "1". In other words, the most significant bit is always "0". As a result, with the value of the most significant bit of 24 bits (eight bytes), an address represented as time information (in the BCD notation) can be distinguished from an address represented in the binary notation. They can be distinguished with a predetermined one bit or a plurality of predetermined bits instead of the most significant bit. In addition, since an address represented as time information varies in a different manner from an address represented in the decimal notation, they can be distinguished. Corresponding to the difference, the disc type can be determined.

As was described above, the format of the time information of the Q channel of the sub code of reproduced data of a CD-ROM is the same as that of a CD-DA (see FIGS. 6 and 7). However, when the time information of the sub code is partly modified, longer time information than the conventional time information can be represented. In other words, the time information of the sub code contains the zero portion (ZERO) 36, 46 of which all eights are all "0s". With the zero portion 36, 46, the time information can be extended. In other words, using all eight bits or low order four bits of the zero portion 36, 46, information of hours (HOUR) is recorded. Alternatively, all eight bits or lower four bits of the zero portion 36, 46 are used for representing the digit of "100" of minutes. Thus, time information of the sub code corresponding to a high density CD-ROM can be represented.

Figure 10C:
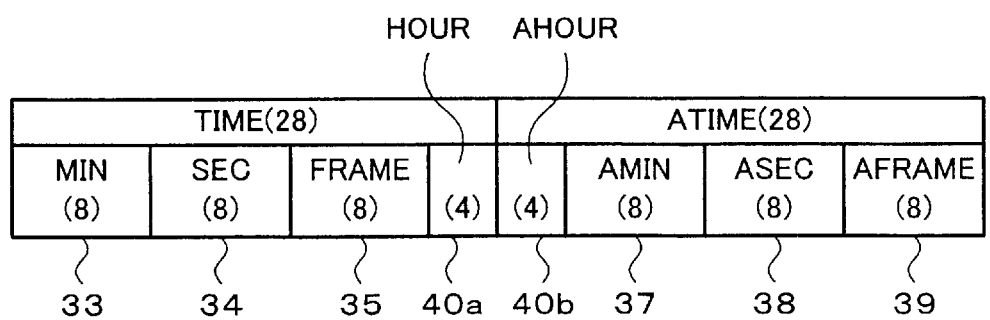

FIG. 10C shows the format of the sub code of, which hour information is recorded with the zone portion. The eight bits of the zero portion 36 area divided into two four-bit portions. The first four-bit area 40a is assigned to the "hour" digit (HOUR) of the relative time. The second four-bit area 40b is assigned to the "hour" digit (AHOUR) of the absolute time. Since the relative hour information is less important, in the case of a high density disc, hour information is not actually recorded. Instead, these areas contain "FF FF FF Fh". The "hour" digit of the absolute time (AHOUR) is represented in the BCD code (0 to 9). In a high density disc, for example, the start position of the lead in area is 0 hours, 09 minutes, and 50 frames in the absolute time, whereas the start position of the program area is 0 hours, 12 minutes, and 00 frames in the absolute time.

There are two representing methods of addresses that are BCD notation (as time information) and binary notation. However, they are correlated in the relation of one to one. Next, with reference to FIG. 11, the relation between two address representing methods will be described. When address information represented in the BCD notation is converted into that in the binary notation, the following operation is performed.

The sum of (value of "hour" digit×60×60×75+value of "minute" digit×60×75+value of "second" digit×75+value of "frame" digit) is represented with a 24-bit (or 23-bit) binary number.

In contrast, when an address represented in the binary notation is converted into time information (HMSF) represented in the BCD notation, the following operation is performed.

Assuming that the value of the binary number of 24 bits (or 23 bits) is a, the following divisions are calculated:

$$a/(60\times 60\times 75)=H \text{ (as quotient)} \ldots b$$

(as remainder)

$$b/(60\times 75)=M \text{ (as quotient)} \ldots c \text{(as remainder)}$$

$$c/75=S \text{ (as quotient)} \ldots F \text{ (as remainder)}$$

Next, a reproducing apparatus that reproduces data from a CD-ROM copied from a maser that contains a signal of time information represented in the BCD notation and an signal of address information represented in the binary notation by the mastering apparatus 10 will be described. The reproducing apparatus can reproduce data from a CD-DA.

Figure 12:
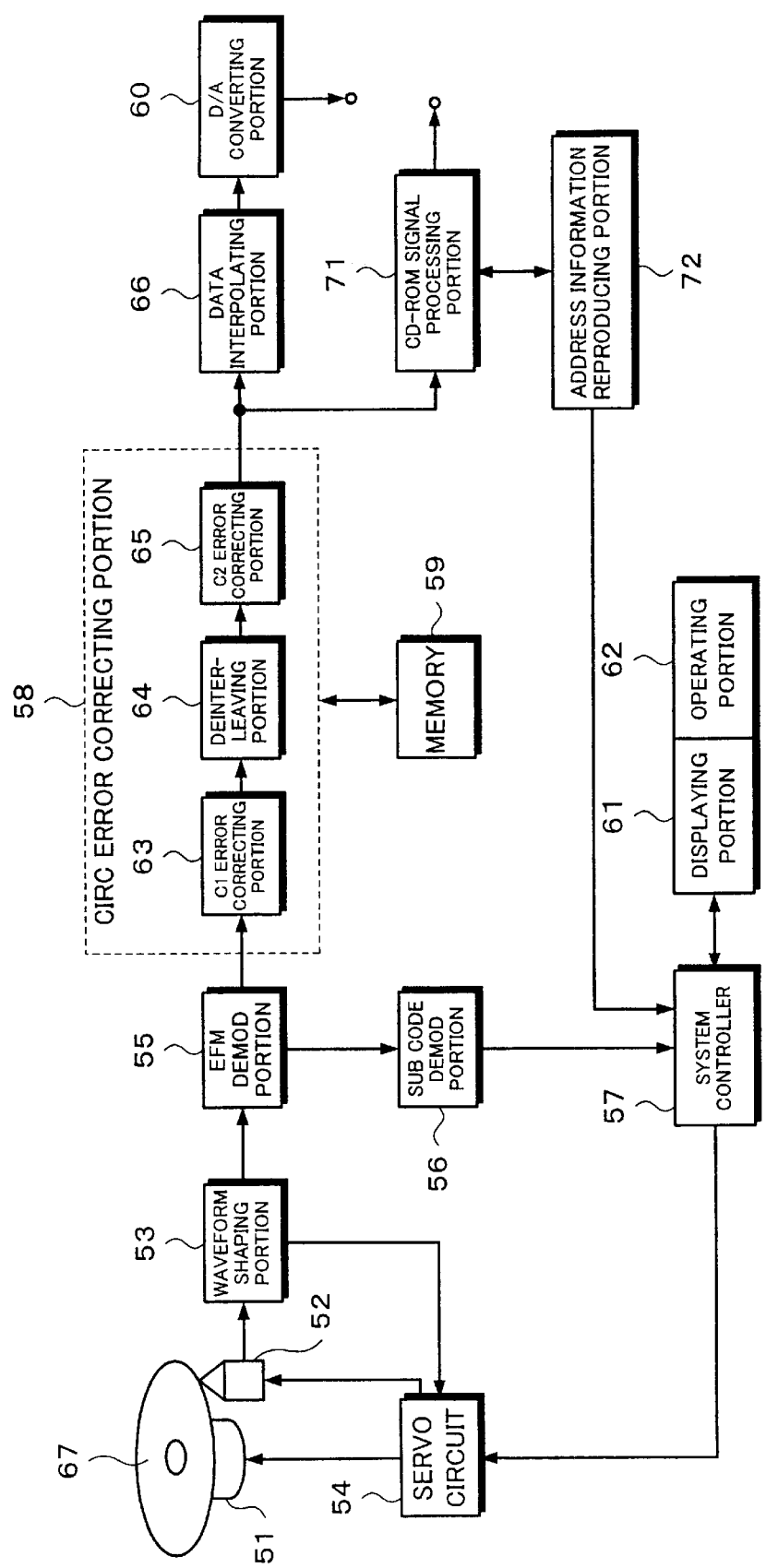
FIG. 12 is a block diagram showing the structure of a reproducing apparatus according to the embodiment of the present invention.

As shown in FIG. 12, a reproducing apparatus 50 comprises a spindle motor 51, an optical pickup 52, and a waveform shaping portion 53. The spindle motor 51 rotates and drives a disc 67. The optical pickup 52 is a reproducing means having a laser, an optical system, and so forth. The laser is for example a gas laser (such as a He—Ne laser) or a semiconductor laser. The optical system radiates laser light emitted from the laser to the disc 67. The waveform shaping portion 53 inputs an RF signal read by the optical pickup 52 from the disc 67 and shapes the waveform thereof.

The reproducing apparatus 50 also comprises a servo circuit 54, an EFM demodulating portion 55, a sub code demodulating portion 56, and a system controller 57. The servo circuit 54 controls the rotating/driving operation of the spindle motor 51 corresponding to a reproduced clock of the RF signal received from the waveform shaping portion 53 and controls the operation of the optical pickup 52 corresponding to information that is input from the system controller 57. The EFM demodulating portion 55 demodulates a signal that has been EFM modulated and outputs digital data and parity data. The sub code demodulating portion 56 demodulates the above-described sub code. The system controller 57 inputs the sub code demodulated by the sub code demodulating portion 56, controls the servo circuit 54 corresponding to information of the P channel and the Q channel and information that is input from an operating portion 62 (that will be described later), and generates information that is displayed on a displaying portion 61 (that will be described later) corresponding to information of the sub code.

The reproducing apparatus 50 further comprises a CIRC error correcting portion 58, a memory 59, a data interpolating portion 66, and a D/A (digital/analog) converting portion 60. The CIRC error correcting portion 58 inputs an eight-bit data demodulated by the EFM demodulating portion 55 and corrects an error of the demodulated data corresponding to CIRC method. The memory 59 buffers data whose error has been corrected by the CIRC error correcting portion 58. The data interpolating portion 66 performs an interpolating process for data whose error could not be corrected by the CIRC error correcting portion 58. The D/A converting portion 60 converts digital audio data whose error has been corrected into an analog signal.

The CIRC error correcting portion 58 comprises a C1 error correcting portion 63, a deinterleaving portion 64, and a C2 error correcting portion 65. The C1 error correcting portion 63 performs a C1 sequence error correcting process for eight-bit data demodulated by the EFM demodulating portion 55. The deinterleaving portion 64 deinterleaves data whose error has been corrected by the C1 error correcting portion 63. The C2 error correcting portion 65 performs a C2 sequence error correcting process for data that has been deinterleaved.

When the disc 67 is a CD-ROM, the interpolating process is not performed. An output signal of the CtRC error correcting portion 58 is supplied to a CD-ROM signal processing portion 71. The CD-ROM signal processing portion 71 performs a signal process for a signal corresponding to the CD-ROM format. Data that is output from the CD-ROM signal processing portion 71 is supplied to an external host computer through an interface (not shown). The data that is read from the CD-ROM signal processing portion 71 contains an address represented in the binary notation.

The reproducing apparatus 50 also comprises the above mentioned displaying portion 61 and operating portion 62. The displaying portion 61 displays information generated by the system controller 57 corresponding to time information of the Q channel. The operating portion 62 has operation buttons such as a playback button and a pause button.

An address information reproducing portion 72 connected to the CD-ROM signal processing portion 71 extracts address information of the header of the data. When the disc 67 is a conventional CD-ROM, the address information is represented as time information. When the disc 67 is a high density disc, the address information is represented in the binary notation. The extracted address information is supplied to the system controller 57. The address information is used to seek a predetermined position of the CD-ROM. In addition, the address information is used to distinguish whether the address information is represented in the BCD notation or the binary notation. Corresponding to the distinguished result, it can be determined whether the disc 67 is a conventional CD-DA (CD-ROM) or a high density disc. Corresponding to the determined result, the servo system can be adjusted and the gain and so forth of the RF equalizer can be adjusted or selected for the disc.

Next, the case that the present invention is applied to a CD-R and a CD-RW will be described. A CD-RW is a phase change type disc of which data can be recorded with laser light and data can be reproduced by detecting the difference of light amounts. The material of the base on which a record film is coated is polycarbonate. Track guide grooves are formed on the base material by an injection molding process. They are also referred to as pre-grooves. A land is formed between adjacent grooves. Grooves are formed successively and spirally from the inner periphery to the outer periphery. On the other hand, a CD-R is a write-once-read-many type record medium whose record material is an organic pigment.

Figure 13:
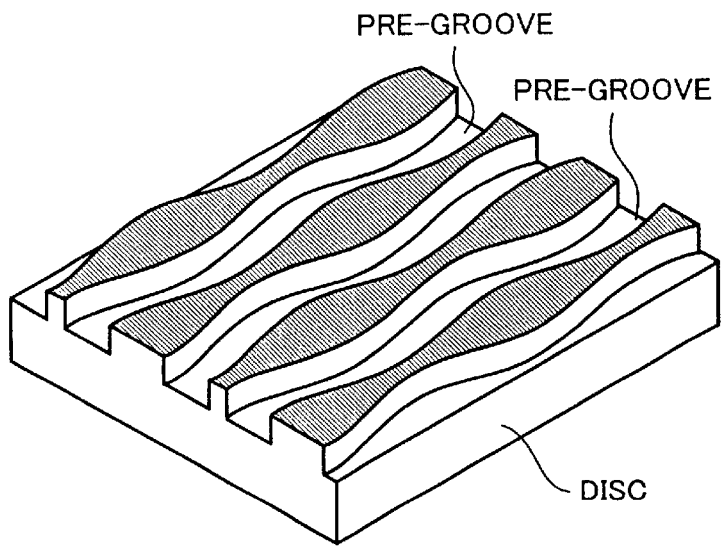
FIG. 13 is an enlarged perspective view showing a principal portion of pre-grooves of a record medium according to the embodiment of the present invention.

As shown in FIG. 13, on a CD-R and a CD-RW, wobbled guide groves are pre-formed (referred to as pre-grooves).

Figure 14:
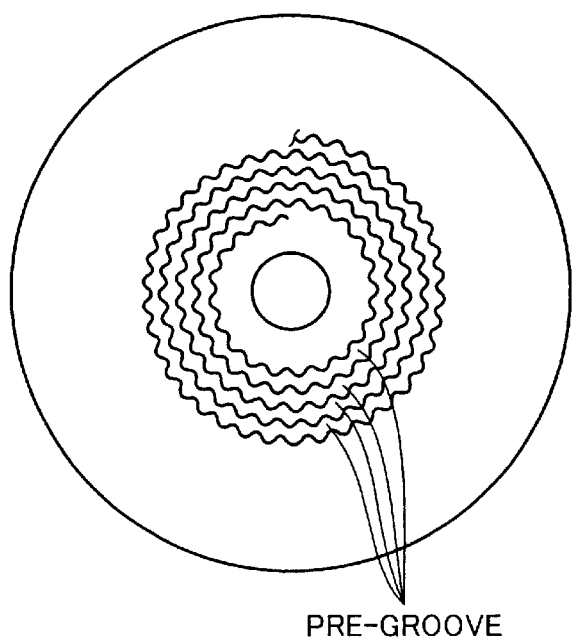
FIG. 14 is a schematic diagram showing pre-grooves of the record medium according to the embodiment of the present invention.

The pre-grooves are formed by frequency-modulating a carrier signal of 22.05 kHz with address information and radially wobbling a laser beam with the resultant frequency modulated signal. In the CD-R and the CD-ROM, with reference to an address obtained corresponding to wobble information, the optical pickup is moved to a desired write position and data is written thereto. When digital data is recorded and/or reproduced with the pre-grooves, a rotation synchronous signal for controlling the spindle motor is obtained. As shown in FIG. 14, the pre-grooves are formed on the entire disc and address information is pre-assigned. The address information is referred to as ATIP (Absolute Time In Pre-grooves) that represent absolute addresses on the disc.

In a CD-R and a CD-RW, grooves are wobbled corresponding to FM (FSK) at a frequency of ±1 kHz with a carrier of 22.05 kHz. When the FM signal is demodulated, a bi-phase signal is obtained with a clock of 6.3 kHz. When the bi-phase signal is demodulated, data of 3150 bits/sec is obtained. Since one second is equivalent to 75 frames, one frame of ATIP data is composed of 42 bits.

Figure 15A:
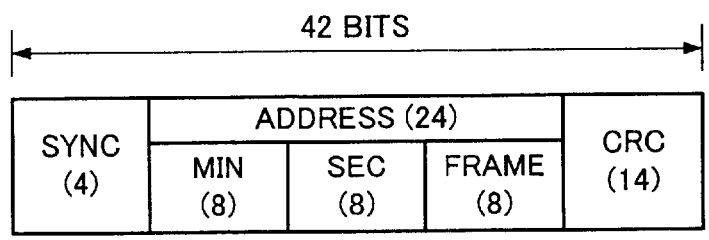
FIGS. 15A and 15B are schematic diagrams showing examples of the formats of ATIP of conventional CD-R and CD-RW and the formats of ATIP of high density CD-R and CD-RW.

FIG. 15A shows the data structure of one frame of ATIP of conventional CD-R and CD-RW. The ATIP of one frame is composed of a sync portion of four bits, an absolute address portion (ADDRESS) of 24 bits, and a CRC (Cyclic Redundancy Check code) portion of 14bits. The sync portion is used to identify the beginning of the ATIP. The absolute address portion (ADDRESS) will be descried later. The sync portion is a unique pattern that does not take place as a bi-phase mark. Three eight-bit portions of 24 bits represent minutes, seconds, and frames of an address (time information) represented in the BCD notation. With the 24 bits, addresses of up to 99 minutes, 59 seconds, and 74 frames can be represented. Assuming that the data amount of one frame is 2 kbytes, addresses of around 900 Mbytes can be represented.

In the absolute address portion (ADDRESS), the absolute address of a frame is represented with time information composed of minutes (MIN), seconds (SEC), and frames (FRAME). The absolute address portion (ADDRESS) is composed of an absolute address minute component portion (MIN), an absolute address second component portion (SEC), and an absolute address frame component portion (FRAME). Each of these portions is composed of eight bits. The absolute address portion (ADDRESS) is equivalent to the time information placed on the Q channel of the sub code portion of the above-described CD-DA. Each of the absolute address minute component portion (MIN), the absolute address second component portion (SEC), and the absolute address frame component portion (FRAME) is represented with a two-digit BCD code.

Figure 15B:
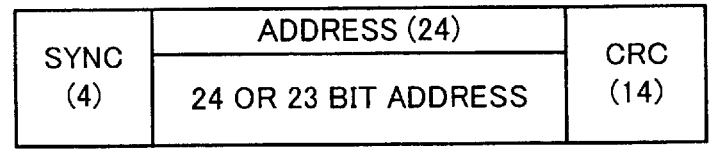

According to the embodiment of the present invention, as shown in FIG. 15B, in a high density disc, the address representing portion of 24 bits is represented in the binary notation. When 24 bits are represented in the binary notation, addresses of $2^{24}=16777216$ can be represented. Thus, assuming that the data amount of one frame is 2 kbytes, data of up to around 33 Gbytes can be addressed. Thus, addresses corresponding to a high density disc can be represented. In other words, when data of the pre-groove area exceeds 80 minutes or 100 minutes in high density CD-R and CD-RW, an absolute address can be represented with a 24-bit or 23-bit binary number for all areas of "MIN", "SEC", and "FRAME" of the ATIP.

In the formats of conventional CD-R and CR-RW, the most significant bit is not actually used. In other words, the most significant bit is always "0". Thus, when the most significant bit is "1", it represents an address in the binary notation. In this case, although time information or addresses that can be represented is halved, much more addresses than conventional discs can be represented. In addition, instead of address information, additional information can be distinguished with the most significant bit.

Since the process for assigning absolute addresses to pre-grooves is the same as the process of which the mastering apparatus 10 records time information to a disc, the description of the process is omitted.

As an example of the recording apparatus that records data to a disc on which grooves have been formed and absolute addresses have been assigned to the grooves, a CD recorder is known. The format of data recorded on a disc by the CD recorder is the same as the data format of the above-described CD-ROM. At this point, the Q channel recorded in association with data and the absolute address represented with the header portion of the data are recorded as time information in such a manner that they synchronize with the absolute address represented by the ATIP.

Figure 16:
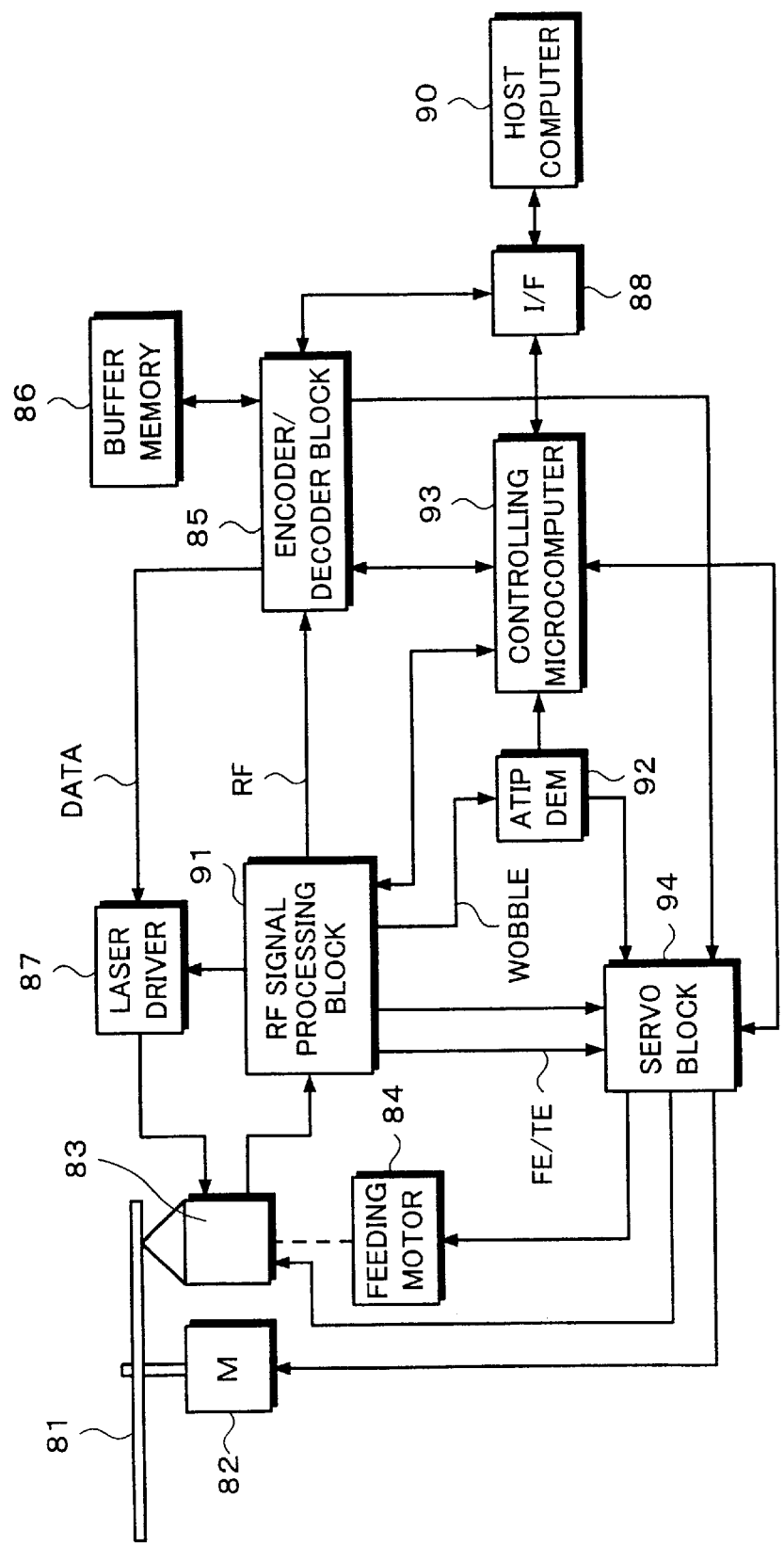
FIG. 16 is a block diagram showing the structure of a recording apparatus according to the embodiment of the present invention.

With reference to FIG. 16, an example of the structure of a CD recorder will be described. In FIG. 16, reference numeral 81 is an optical disc—for example a CD-RW. The optical disc 81 is rotated and driven by a spindle motor 82. An optical pickup 83 is disposed so as to record data to the optical disc 81 and reproduce data therefrom. The optical pickup 83 is traveled in the radius direction of the optical disc 81 by a feeding motor 84.

Data is supplied from an external host computer 90 to the drive through an interface 88. An encoder/decoder block 85 is connected to the interface 88. A buffer memory 86 is connected to the encoder/decoder block 85. The buffer memory 86 stores write data or read data. The write data is supplied from the interface 88 to the encoder/decoder block 85. The encoder/decoder block 85 converts the write data into sector structured data. In addition, the encoder/decoder block 85 encodes the write data with an error correction code. Moreover, the encoder/decoder block 85 performs an EFM modulating process and a frame synchronous signal adding process.

In addition to the ATIP, the encoder/decoder block 85 adds addresses as a sub code to write data and to the header of data.

Frame structured data is supplied from the encoder/decoder block 85 to a laser driver 87. The laser driver 87 generates a drive wave form having a predetermined level so as to record data to the optical disc 81. An output signal of the laser driver 87 is supplied to the optical pickup 83. The optical pickup 83 records the data to the optical disc 81. The laser output of the laser driver 87 is properly controlled by an APC (Automatic Power Control) of an RF signal processing block 91.

The optical pickup 83 reproduces data from the optical disc 81. A signal detected by a four-divided photo detector is supplied to the RF signal processing block 91. In the RF signal processing block 91, a matrix amplifier calculates a detection signal received from the photo detector and generates a reproduction (RF) signal, a wobble signal, a tracking error signal TE, and a focus error signal FE. The RF signal is supplied to the-encoder/decoder block 85. The wobble signal is obtained as a push pull signal is supplied to an ATIP demodulator 92. The tracking error signal and the focus error signal are supplied to a servo block 94.

The encoder/decoder block 85 performs an EFM demodulating process, an error correction code decoding process (namely, an error correcting process), and a de-sectoring process (for converting sector structured data into reproduction data). In the encoder/decoder block 85, the reproduction data is stored in the buffer memory 86. When the encoder/decoder block 85 receives a read command from the host computer 90, the encoder/decoder block 85 sends read data to the host computer 90 through the interface 88.

An ATIP demodulator 92 supplies the wobble signal to an FM demodulator through a band pass filter that passes only a signal with a carrier frequency (22.05 kHz). The FM demodulator outputs a bi-phase signal. In addition, a clock signal is obtained from the bi-phase signal. The clock signal is used to control the spindle motor 82. With the clock signal, address data is extracted from the bi-phase signal. The address data is supplied from the ATIP demodulator 92 to a controlling microcomputer 93. The controlling microcomputer 93 controls the seek operation using the address. The controlling microcomputer 93 controls the interface 88, the encoder/decoder block 85, the RF signal processing block 91, and the servo block 94.

The frame synchronous signal, the tracking error signal, and the focus error signal received from the RF signal processing block 91 and the clock signal received from the ATIP demodulator 92 are supplied to the servo block 94. The servo block 94 performs a tacking servo operation and a focus servo operation for the optical pickup 83. In addition, the servo block 94 performs a spindle servo operation for the spindle motor 82 and a thread servo operation for the feeding motor 84.

Next, the recording operation of the CD recorder according to the present invention will be described. Record data received from the host computer 90 is stored to the buffer memory 86 through the interface 88. The controlling microcomputer 93 controls the servo block 94 so that data is recorded at a desired position of the optical disc 81. The servo block 94 operates the spindle motor 82 and the feeding motor 84 so as to control the position of the optical pickup 83 against the optical disc 81. The ATIP information formed on the optical disc 81 is demodulated by the ATIP demodulator 92 through the optical pickup 83. The demodulated ATIP information is supplied from the ATIP demodulator 92 to the controlling microcomputer 93. When the loaded optical disc 81 is a high density disc, the ATIP information is input as binary data to the controlling microcomputer 93. The controlling microcomputer 93 determines that the optical disc 81 is a high density disc corresponding to the contents of the ATIP information received from the ATIP demodulator 92. In addition, the controlling microcomputer 93 determines the position of the optical pickup 83 against the optical disc 81 with the obtained binary data. The encoder/decoder block 85 adds an error correction code to the record data stored in the buffer memory 86. In addition, the encoder/decoder block 85 converts the record data into sectors shown in FIG. 9. The absolute address contained in the header portion is added in synchronization with the ATIP at the record positon on the optical disc 81 by the controlling microcomputer 93. When the optical disc 81 is a high density disc, since the ATIP information (see FIG. 15B) and the absolute address (see FIG. 10B) added to the header portion are composed of binary data, the controlling microcomputer 93 can directly use the ATIP information at the record position as the address of the header portion. In addition, the encoder/decoder block 85 adds error correction parity data and a sub code to record data that has been converted into data in the CD-ROM format. As a result, the encoder/decoder block 85 forms a sub code frame as shown in FIG. 3. When the optical disc 81 is a high density disc, the absolute time information placed on the Q channel of the sub code, (where time information includes the "hour" digit (AHOUR) as shown in FIG. 10C), is recorded with a BCD code. Thus, as was described with reference to FIG. 11, the controlling microcomputer 93 converts the ATIP information at the record position into a BCD code. The absolute time information placed on the Q channel is added to the record data corresponding to the converted ATIP information. In addition, the encoder/decoder block 85 EFM-modulates the record data as sub code frames. The resultant data is supplied to the laser driver 87. The laser driver 87 drives the optical pickup 83 in synchronization with the input record data and radiates laser light with a predetermined record power to a designated position of the optical disc 81 so as to record the record data to the optical disc 81.

In the above described example, the ATIP information has been recorded as binary data on the optical disc 81. When the ATIP information has been recorded as a BCD code composed of "hour", "minute", "second", and "frame" digits, the controlling microcomputer 93 converts the ATIP information into binary data so that the ATIP information corresponds to the address information recorded in the header portion.

Thus, in the CD recorder according to the present invention, data can be handled among a plurality of different address representing formats.

As described above, when the CD recorder records data, the CD recorder performs an ATIP demodulating process so as to reproduce an address of ATIP in the binary notation. In addition, when the CD recorder records data exceeding 80 minutes or 100 minutes, the CD recorder reads an address of ATIP and accurately reproduces it as with the above-described reproducing apparatus 50. Corresponding to the address of ATIP represented in the binary notation, the CD recorder records the address represented in the binary notation to the header portion of the record data along therewith. In addition, the CD recorder records "HOUR", "MIN", "SEC", and "FRAME" of the Q channel as time information and represents an absolute address of the record data. The CD recorder converts the address represented in the binary notation into time information in the above-described manner. The sub code may the same as that of the conventional CD-DA. Alternatively, the "hour" digit may be recorded to the zero portion. In addition, the "minute" digit may be extended to the zero portion.

As is clear from the above description, according to the present invention, as optical record mediums such as a CD-ROM, a CD-R, and a CD-RW of high density type are becoming common, even if addresses exceeding 99 minutes, 99 seconds, 74 frames are required, data record mediums corresponding to such addresses can be provided.

In consideration with a problem of a time representation such as playback time, since time information recorded as a sub code is represented in the BCD notation as with conventional discs, high density discs with high compatibility with conventional discs can be accomplished.

In addition, since each of address information of the header portion of a CD-ROM and record information of ATIP is represented with a 24-bit binary number, they are highly harmonized with a computer environment, easily used, and applicable to a storage capacity of up to 33 Gbytes.

In addition, the formats of a CD-ROM, a CD-R, and a CR-RW are the same as those of conventional discs except for the address representing portion of 24 bits. Thus, required circuits and software can be suppressed from being largely changed. As a result, it is easy to have compatibility with conventional discs.

In addition, since the disc type can be distinguished corresponding to the address information of the header portion of a CD-ROM and the representing method of the record address information of ATIP, the servo and RF equalizer can be properly set corresponding to the disc.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data record medium for recording a digital signal composed of main data and a sub code, the sub code having time information representing reproduction elapsed time, the sub code being recorded in association with the main data, the data record medium comprising:
   a sub code area where the time information represented by a binary coded decimal number is recorded in a time portion thereof,
   a header area for recording therein address information represented by a binary number that is a part of the main data and that is in synchronization with the time information recorded in the sub code area, and a data area for recording therein user data that is received as a part of the main data to be recorded.

2. The data record medium as set forth in claim 1, wherein the time information is composed of minute information representing a minute component, second information representing a second component, and frame information representing a frame component.

3. The data record medium as set forth in claim 2, wherein the time information is further composed of hour information representing a hour component.

4. The data record medium as set forth in claim 2, wherein each of the minute information, the second information, and the frame information is represented by a one-byte binary coded decimal number.

5. The data record medium as set forth in claim 1, wherein the address information is composed of up to three bytes.

6. The data record medium as set forth in claim 1, wherein a unit of the address information is a frame.

7. The data record medium as set forth in claim 1, wherein the address information and the time information are correlated in a relation of one to one.

8. The data record medium as set forth in claim 1, wherein the main data is modulated corresponding to an EFM method.

9. A data record medium on which record address information represented by a binary number for use as a guide for subsequently recording data has been recorded, the data record medium comprising a record area for recording therein main data and a sub code corresponding to the record address information represented by the binary number, the sub code having time information recorded in a time portion thereof representing a reproduction elapsed time in a binary coded decimal notation in association with the main data.

10. The data record medium as set forth in claim 9, wherein guide grooves wobbled at a predetermined period formed and the record address information modulated at a predetermined period is assigned to the guide grooves.

11. The data record medium as set forth in claim 9, wherein the time information is composed of minute information representing a minute component, second information representing a second component, and frame information representing a frame component.

12. The data record medium as set forth in claim 11, wherein the time information is further composed of hour information representing an hour component.

13. The data record medium as set forth in claim 11, wherein each of the minute information, the second information, and the frame information is represented by a one-byte binary coded decimal number.

14. The data record medium as set forth in claim 9, wherein the address information is composed of up to three bytes.

15. The data record medium as set forth in claim 9, wherein a unit of the address information is a frame.

16. The data record medium as set forth in claim 9, wherein the address information and a time information are correlated in a relation of one to one.

17. The data record medium as set forth in claim 9, wherein the main data has address information represented with a binary number in synchronization with the time information.

18. The data record medium as set forth in claim 17, wherein a data structure of the record address information is substantially the same as a data structure of the address information.

19. The data record medium as set forth in claim 9, wherein the main data is modulated corresponding to an EFM method.

20. The data record medium as set forth in claim 9, wherein the data record medium is composed of an organic pigment.

21. The data record medium as set forth in claim 9, wherein the data record medium is a phase change type record medium.

22. The data record medium as set forth in claim 9, wherein-the data record medium is a magneto-optical type record medium.

23. The data record medium as set forth in claim 1, wherein the data record medium is formed corresponding to a pit-and-land physical change.

24. The data record medium as set forth in claim 1 or 9, wherein the data record medium has an identifier representing a high density data structure relative to a data structure of a CD standard.

25. A recording apparatus for recording main data and a sub code to a data record medium, the sub code having time information representing a reproduction elapsed time, the sub code being recorded in association with the main data, comprising:
   means for generating the time information as a binary coded decimal number;
   converting means for converting the binary coded decimal number into a decimal number; and
   recording means for causing said converting means to convert address information that is contained in the main data and that is in synchronization with the time information into a binary number and for recording the converted address information represented by the binary number along with the time information represented as the binary coded decimal number on the data record medium.

26. A data record medium for recording a digital signal composed of main data and a sub code, the sub code having time information representing reproduction elapsed time, the sub code being recorded in association with the main data, the data record medium comprising:
   a sub code area where the time information represented by a binary coded decimal number is recorded in a time portion thereof, wherein the time information recorded in the time portion includes minute information representing a minute component, second information representing a second component, and frame information representing a frame component, and wherein the time information is expanded to include hour information representing an hour component and the hour information is recorded in a zero portion adjacent the time portion of the sub code area;

a header area for recording therein address information represented by a binary number, wherein the address information is a part of the main data and is in synchronization with the time information recorded using the binary coded decimal number in the sub code area; and a data area for recording therein user data that is received as a part of the main data to be recorded, wherein the user data is represented by a binary number.

27. A recording apparatus for recording main data and a sub code to a data record medium, the sub code having time information representing a reproduction elapsed time, the sub code being recorded in association with the main data, comprising:

means for generating the time information as a binary coded decimal number;

converting means for converting the binary coded decimal number into a decimal number; and recording means for causing said converting means to convert address information that is contained in the main data and that is in synchronization with the time information into a binary number and for recording resultant converted data along with the time information on the data record medium, the time information being recorded in a time portion of a sub code area, wherein the time information recorded in the time portion includes minute information representing a minute component, second information representing a second component, and frame information representing a frame component, and wherein the time information is expanded to include hour information representing an hour component and the hour information is recorded in a zero portion adjacent the time portion of the sub code area.

* * * * *